(12) United States Patent
Ozeki

(10) Patent No.: US 11,077,747 B2
(45) Date of Patent: Aug. 3, 2021

(54) VEHICLE FRONT STRUCTURE

(71) Applicant: HONDA MOTOR CO., LTD., Tokyo (JP)

(72) Inventor: Shohei Ozeki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 160 days.

(21) Appl. No.: 16/448,731

(22) Filed: Jun. 21, 2019

(65) Prior Publication Data

US 2020/0001702 A1 Jan. 2, 2020

(30) Foreign Application Priority Data

Jun. 29, 2018 (JP) .............................. JP2018-125265

(51) Int. Cl.
*B60K 11/08* (2006.01)
*B60H 1/26* (2006.01)
(Continued)

(52) U.S. Cl.
CPC ............... *B60K 11/08* (2013.01); *B60H 1/26* (2013.01); *B60R 19/52* (2013.01); *B62D 25/085* (2013.01); *B62D 25/2018* (2013.01)

(58) Field of Classification Search
CPC ..... F21S 45/20; F21W 2107/10; B60K 11/08; B60R 19/52; B62D 25/085; B62D 25/2018
(Continued)

(56) References Cited

U.S. PATENT DOCUMENTS

2012/0043051 A1\* 2/2012 Kurokawa ............. B60K 11/08
165/41
2012/0068498 A1 3/2012 Wolf
(Continued)

FOREIGN PATENT DOCUMENTS

EP 2489537 A1 \* 8/2012 ............. B60K 11/04
JP 2000-177406 A 6/2000
(Continued)

OTHER PUBLICATIONS

Office Action dated Dec. 5, 2019, issued in counterpart Japanese application No. 2018-125265, with English translation (11 pages).

*Primary Examiner* — Dennis H Pedder
*Assistant Examiner* — Joyce Eileen Hill
(74) *Attorney, Agent, or Firm* — Westerman, Hattori, Daniels & Adrian, LLP

(57) ABSTRACT

A front structure of a vehicle includes a front grille opening disposed at the center in the vehicle width direction in a front part of the vehicle; a radiator disposed at the vehicle rear of the front grille opening; an opening disposed on the outer side in the vehicle width direction in the front part of the vehicle; a cooling device disposed at the vehicle rear of the opening; and a guide portion disposed between the opening and the cooling device and guiding traveling air to the cooling device, in which the guide portion has a tubular main body portion extending in the longitudinal direction of the vehicle, and an extension portion extending toward the center in the vehicle width direction from the main body portion and guiding traveling air from the front grille opening to the cooling device.

12 Claims, 5 Drawing Sheets

(51) Int. Cl.
    *B62D 25/08*      (2006.01)
    *B60R 19/52*      (2006.01)
    *B62D 25/20*      (2006.01)

(58) Field of Classification Search
    USPC .......... 296/203.02, 193.1, 198, 190.09, 208;
                                              180/68.1, 68.2
    See application file for complete search history.

(56) References Cited

U.S. PATENT DOCUMENTS

2012/0211293 A1*  8/2012  Leanza ................ B60K 13/02
                                                         180/68.3
2013/0180789 A1*  7/2013  Maurer ................ B60K 11/08
                                                         180/68.1

FOREIGN PATENT DOCUMENTS

| JP | 2006-327371 A | 12/2006 |
| JP | 2008-49815 A  | 3/2008  |
| JP | 2009-269599 A | 11/2009 |
| JP | 2012-236504 A | 12/2012 |

\* cited by examiner

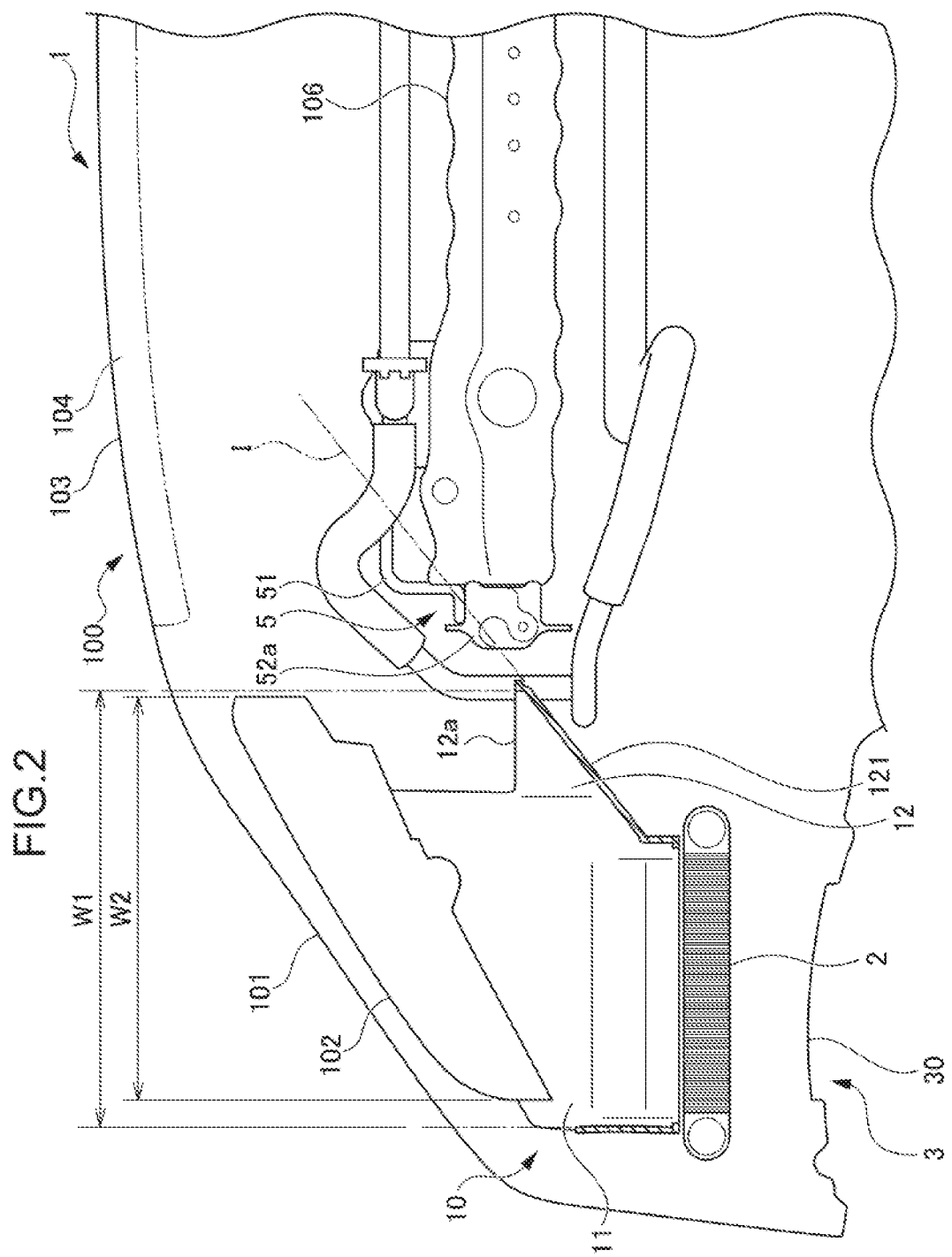

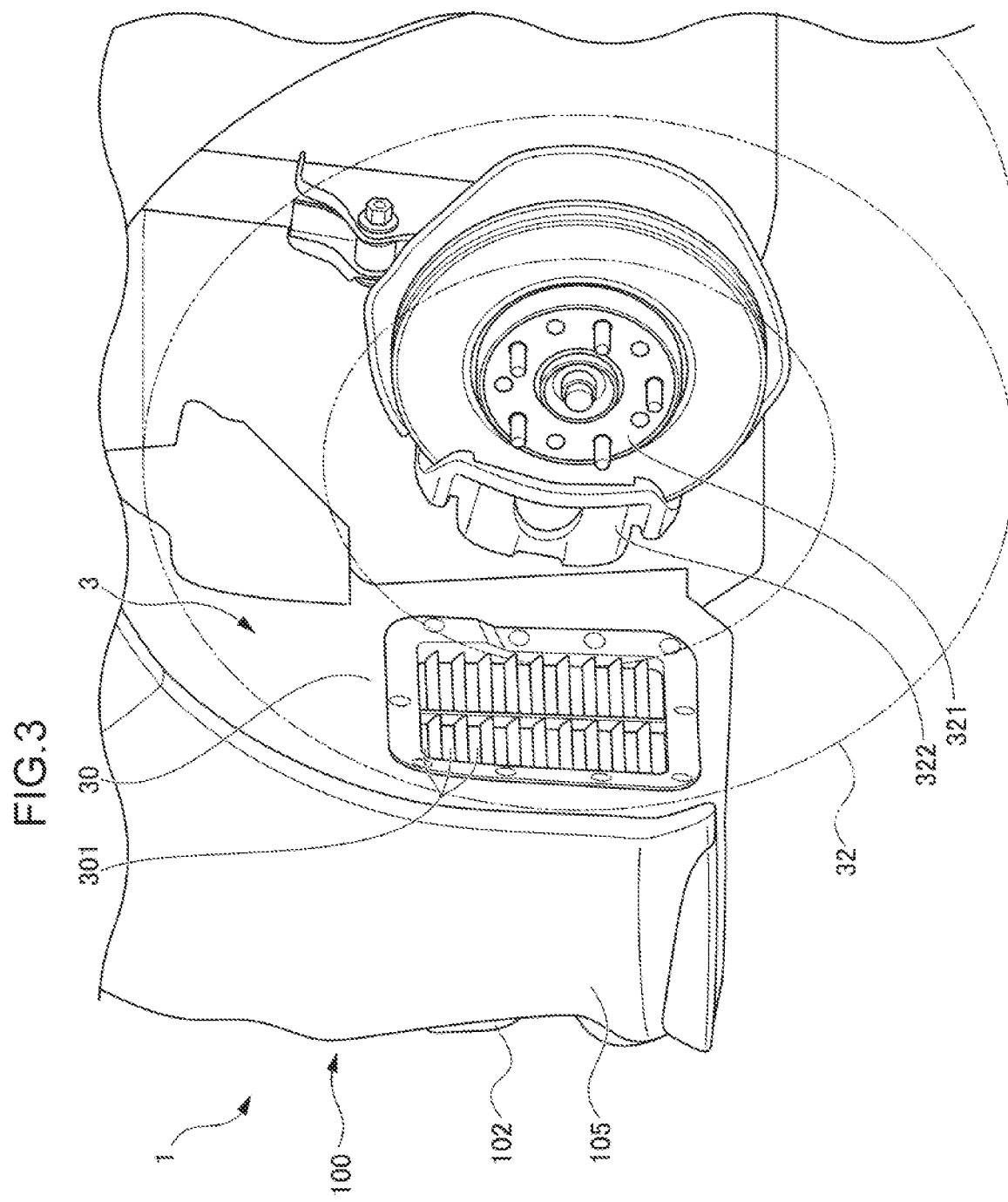

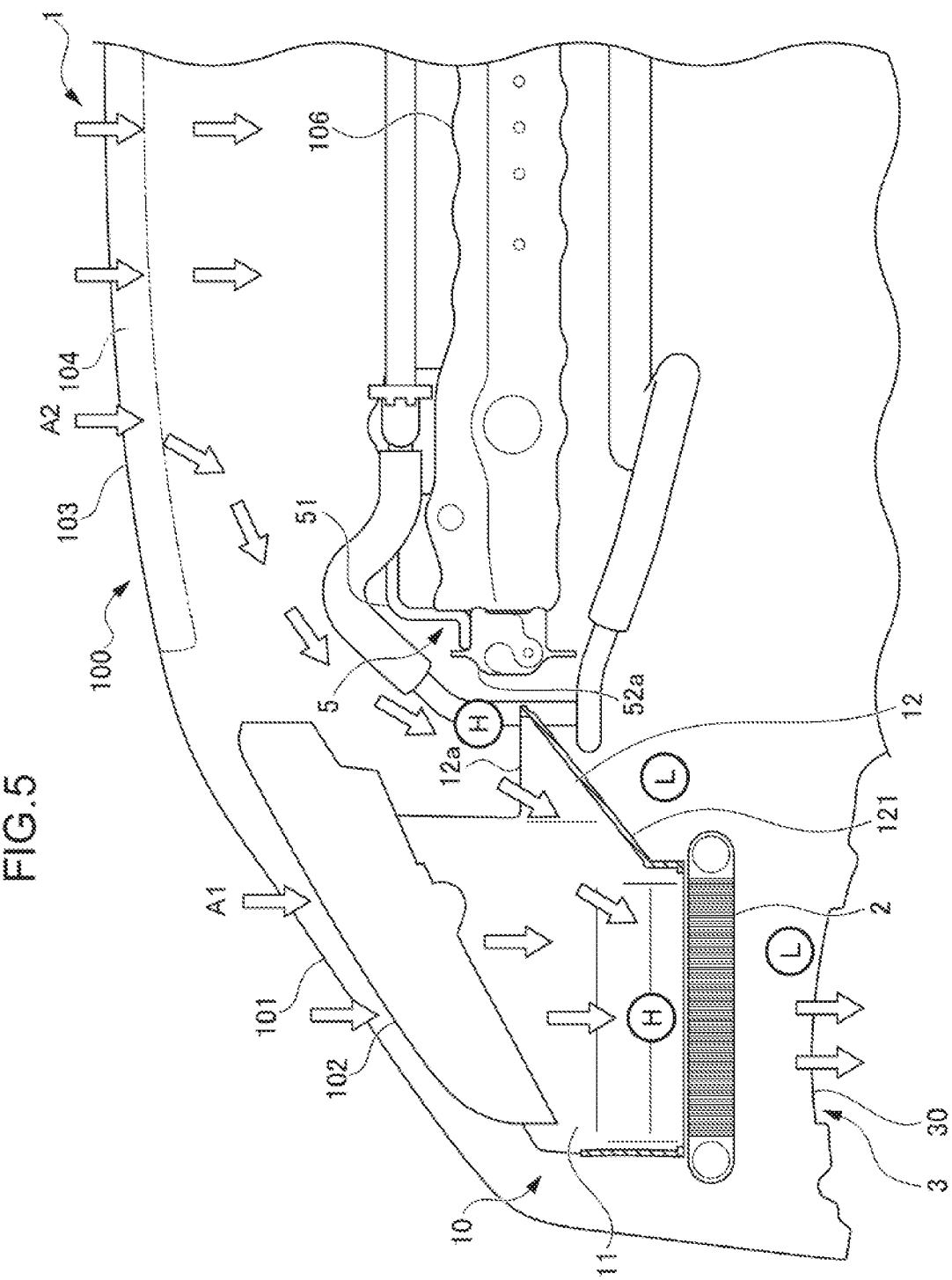

VEHICLE FRONT STRUCTURE

CROSS REFERENCES TO RELATED APPLICATIONS

The present application claims priority under 35 U.S.C. § 119 to Japanese Patent Application No. 2018-125265, filed Jun. 29, 2018, entitled "VEHICLE FRONT STRUCTURE." The contents of this application are incorporated herein by reference in their entirety.

TECHNICAL FIELD

The present disclosure relates to a vehicle front structure.

BACKGROUND

Heretofore, a configuration has been known in which a cooling device is disposed inside a vehicle, and air is taken in and supplied to the cooling device through a fog opening for attaching a fog lamp provided at the front of the vehicle. It has been proposed to provide a tubular guide portion at the front of the cooling device to guide the air from the fog opening to the cooling device (see Japanese Patent Application Publication No. 2012-236504, for example).

SUMMARY

To supply air to the cooling device efficiently, it is desirable that a large amount of air be taken in from the fog opening. However, since the fog opening is formed in a position where the fog lamp is attached and is relatively small, the airflow rate is sometimes insufficient. On the other hand, if the guide portion is enlarged to increase the airflow rate, the guide portion takes up a large space inside the vehicle, and hinders arrangement of other structures. For this reason, there has been a need for a vehicle front structure having a guide portion that is compact but can increase the amount of air taken into a vehicle.

(1) One aspect of the present disclosure provides a vehicle front structure including: a front grille opening (e.g., later-mentioned front grille opening 103) disposed at the center in the vehicle width direction in a vehicle (e.g., later-mentioned vehicle 100) front part; a radiator (e.g., later-mentioned radiator 106) disposed at the vehicle rear of the front grille opening; an opening (e.g., later-mentioned fog opening 101) disposed on the outer side in the vehicle width direction in the vehicle front part; a cooling device (e.g., later-mentioned ATF cooler 2) disposed at the vehicle rear of the opening; and a guide portion (e.g., later-mentioned guide portion 10) disposed between the opening and the cooling device and guiding traveling air to the cooling device, in which the guide portion has a tubular main body portion (e.g., later-mentioned main body portion 11) extending in the longitudinal direction of the vehicle, and an extension portion (e.g., later-mentioned extension portion 12) extending toward the center in the vehicle width direction from the main body portion and guiding traveling air from the front grille opening to the cooling device.

(2) The vehicle front structure may further include a vehicle component (e.g., later-mentioned bulkhead 5) having a stay portion (e.g., later-mentioned stay portion 51) connected to the radiator and bent from an end in the width direction of the radiator toward the vehicle rear, and a plate portion (e.g; later-mentioned plate portion 52) extending upward from the stay portion, and the extension portion may guide traveling air flowing from between the front grille opening and the radiator along the vehicle component to the vehicle rear, to the cooling device.

(3) The extension portion may have an extension wall (e.g; later-mentioned extension wall 121) extending while being inclined toward the center in the vehicle width direction from the vehicle rear to the vehicle front, and the plate portion may be disposed along the inclination of the extension wall.

(4) A vertical dimension of the extension portion may be smaller than a vertical dimension of the main body portion.

(5) The vehicle may further include a wheelhouse portion (e.g., later-mentioned wheelhouse portion 3) disposed at the vehicle rear of the cooling device and housing a front wheel (e.g., later-mentioned front wheel 32), the wheelhouse portion may have a front side face portion (e.g., later-mentioned front side face portion 30) including multiple through holes (e.g., later-mentioned through holes 301) connecting a space on the vehicle rear side of the cooling device and a space inside the wheelhouse portion, and the extension portion may extend so as to block the space on the vehicle rear side of the cooling device.

(6) A fog lamp (e.g., later-mentioned fog lamp 102) may be attached to the opening so that an opening open in the vehicle longitudinal direction is formed in a part of the opening, a dimension of the guide portion in the vehicle width direction may be substantially the same or larger than a dimension of the fog lamp in the width direction in front view of the vehicle, and a vertical dimension of the extension portion may be substantially the same or larger than a vertical dimension of the fog lamp in front view of the vehicle.

(7) A vehicle front end (e.g., later-mentioned extension portion front end 12a) of the extension portion may be located behind a front end (e.g., later-mentioned main body portion front end 11c) of the main body portion.

According to the aspect described in (1), not only traveling air flowing in from the opening, but also traveling air flowing in from the front grille opening can be guided to the cooling device. Since a sufficient amount of traveling air hitting the cooling device can be ensured, the inside of the vehicle can be cooled efficiently.

According to the aspect described in (2), since traveling air flowing from between the front grille opening and the radiator along the vehicle component to the vehicle rear is guided to the cooling device by the extension portion, the shape of the vehicle component disposed inside the vehicle can be utilized to ensure the amount of traveling air. Hence, a sufficient amount of traveling air hitting the cooling device can be ensured.

According to the aspect described in (3), the traveling air flowing along the plate portion can be taken into the guide portion side along the inclination of the extension wall, and can be brought into contact with the cooling device. Accordingly, not only can the airflow rate be increased, but also the shape of the plate portion disposed inside the vehicle can be utilized.

According to the aspect described in (4), the air pressure in the extension portion increases, and strong traveling air can be transmitted to the cooling device.

According to the aspect described in (5), while traveling air is sucked in by rotation of the front wheel through the through holes, traveling air sucked in from the front grille opening is partially blocked by the extension portion. Hence, a negative air pressure is generated on the vehicle rear side of the cooling device, and a pressure difference occurs on the front and rear of the cooling device. The pressure difference increases the amount of sucked in traveling air, and the cooling effect can be enhanced even more.

According to the aspect described in (6), the fog lamp is attached in the opening, and even if the vehicle crashes into an external structure and the fog lamp is crushed into the vehicle, since the fog lamp can be received by the guide portion, the fog lamp can be kept from going further than the guide portion and colliding with structures in the vehicle rear.

According to the aspect described in (7), since the front end of the extension portion is located behind the front end of the main body portion, a larger amount of traveling air flowing from the front of the vehicle can be taken into the guide portion.

One embodiment of the present disclosure can provide a vehicle front structure having a compact guide portion that can increase the amount of air taken into a vehicle. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

FIG. 2 is a partial plan view of the vehicle front part of the embodiment.

FIG. 3 is a perspective view of a wheelhouse portion of the embodiment as viewed from the rear side.

FIG. 4A is a perspective view and FIG. 4B is a top view.

FIG. 5 is an explanatory view for describing the flow path and pressure of air flowing into the vehicle front part of the embodiment.

DETAILED DESCRIPTION

Hereinafter, an embodiment of the present disclosure will be described in detail with reference to the drawings.

Figure 1:
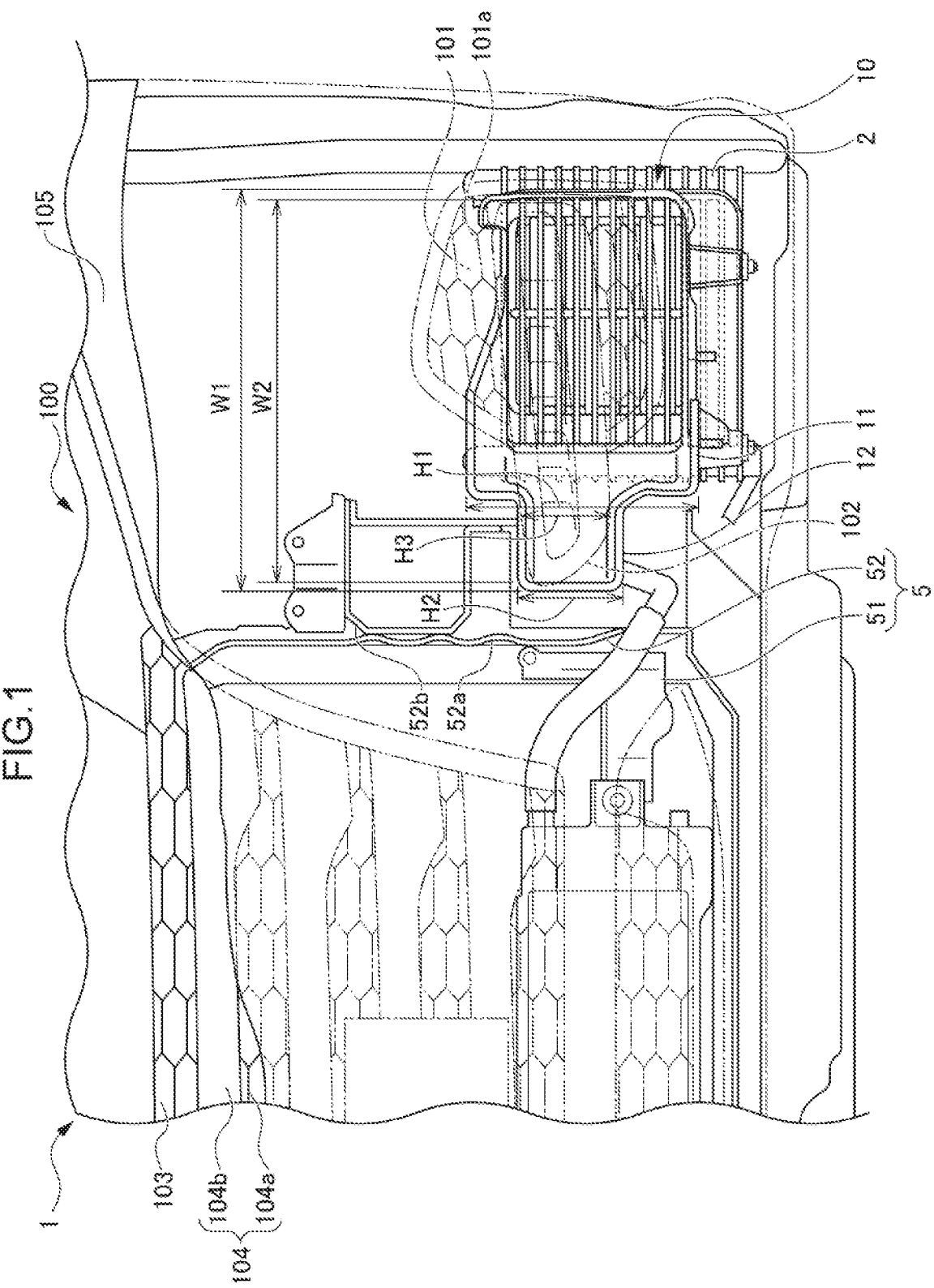
FIG. 1 is a partial front view of a vehicle front part of the embodiment.

FIG. 1 is a partial front view of the front of a vehicle, and shows just one side in the vehicle width direction of the vehicle. Vehicle 100 is a four-wheeled automobile, and as shown in FIG. 1, on the front face of the vehicle 100, disposed are a fog opening 101 as an opening, a fog lamp 102, a front grille opening 103, a front grille 104, and a front bumper 105.

The front bumper 105 is an external member that covers the front face of the vehicle 100, and extends in the vehicle width direction of the vehicle 100.

The front grille opening 103 is disposed at the center in the vehicle width direction in the front part of the vehicle 100. The front grille opening 103 is an opening that penetrates a substantial center part in the width direction of the front bumper 105 and connects the outside and inside of the vehicle 100. The front grille opening 103 has a shape long in the vehicle width direction.

The front grille 104 is a metal lattice plate member attached to the front grille opening 103. The front grille 104 is configured of strip plate portions 104b extending in the width direction and spaced apart from one another in the vertical direction, and disposed on a meshed portion 104a serving as a base. The front grille takes air into the vehicle 100 from the center in the vehicle width direction of the front part of the vehicle.

The fog opening 101 is disposed in the vicinity of one and the other end portions on outer sides in the vehicle width direction in the front part of the vehicle 100. The fog opening 101 is an opening that penetrates the outer side in the vehicle width direction of the front bumper 105 and connects the outside and inside of the vehicle 100. A metal mesh 101a is provided on the fog opening 101.

The fog lamp 102 has a long narrow shape, and is attached to the mesh 101a of the fog opening 101 such that the longitudinal direction of the fog lamp extends along the vehicle width direction. As shown in FIG. 1, when the fog lamp 102 is attached to the fog opening 101, the fog opening 101 has, in a part surrounding the fog lamp 102, an opening which is the mesh 101a open in the vehicle longitudinal direction. The fog lamp 102 has multiple LEDs disposed on the front face side thereof.

FIG. 2 is a partial plan view of the front of the vehicle 100. As shown in FIG. 2, the vehicle 100 also has a radiator 106, a bulkhead 5 as a vehicle component, an ATF (Automatic Transmission Fluid) cooler 2 as a cooling device, a guide portion 10, and a wheelhouse portion 3.

The radiator 106 is disposed at the vehicle rear of the front grille opening 103. The radiator 106 is a heat exchanger that is cooled by air taken in through the front grille 104 and cools a capacitor and the like.

The bulkhead 5 is a frame portion in the front part of the vehicle 100 that is connected to a frame of the vehicle 100 to form the vehicle 100. The bulkhead 5 has a stay portion 51 and a plate portion 52. The stay portion 51 is connected to the radiator 106, extends from an end in the width direction of the radiator 106, and bends toward the rear of the vehicle 100. The plate portion 52 has a plate-shaped member 52a formed into a plate shape extending upward from the stay portion 51, and a pipe-shaped reinforcement portion 52b extending in the longitudinal direction of the vehicle 100 alongside the upwardly extending plate-shaped member 52a (see FIG. 1). The plate portion 52 is disposed along a later-mentioned extension portion 12 of the guide portion 10.

The ATF cooler 2 is disposed at the vehicle rear of the fog opening 101 and in front of the later-mentioned wheelhouse portion 3. The ATF cooler 2 has a thin substantial rectangular parallelepiped shape having a small depth dimension, and houses a heat exchange medium. The ATF cooler 2 is cooled by traveling air flowing into the vehicle from the fog opening 101, and cools hydraulic oil of a transmission (not shown) and the inside of the wheelhouse portion 3 located at the vehicle rear.

FIG. 3 is a perspective view of the wheelhouse portion 3 as viewed from the rear side of the vehicle 100. As shown in FIGS. 2 and 3, the wheelhouse portion 3 is disposed at the vehicle rear of the ATF cooler 2, and is a recessed portion of the vehicle body that houses a wheel (FIG. 3 shows front wheel 32), a brake 321, and a brake caliper 322. The wheelhouse portion 3 has a front side face portion 30 facing the front wheel 32, and multiple through holes 301 connecting a space on the vehicle rear side of the ATF cooler 2 and a space inside the wheelhouse portion 3 are formed on the front side face portion 30.

Referring back to FIG. 2 the guide portion 10 is disposed between the fog opening 101 and the ATF cooler 2, and guides traveling air flowing through the fog opening 101 toward the ATF cooler 2.

Figure 4A:
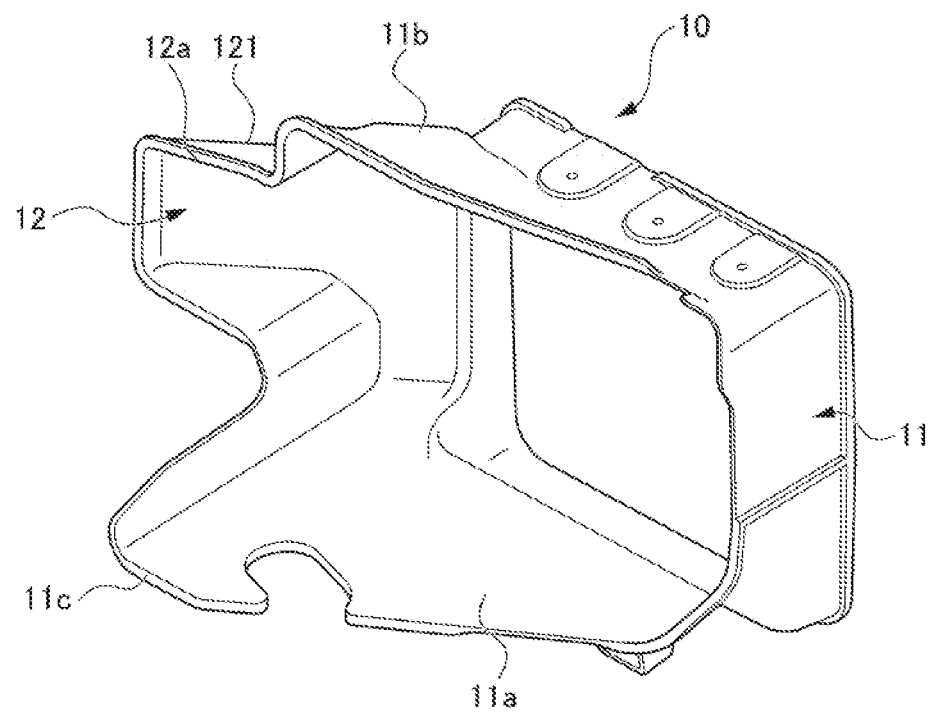
FIGS. 4A, 4B show a guide portion of the embodiment, where
Figure 4B:
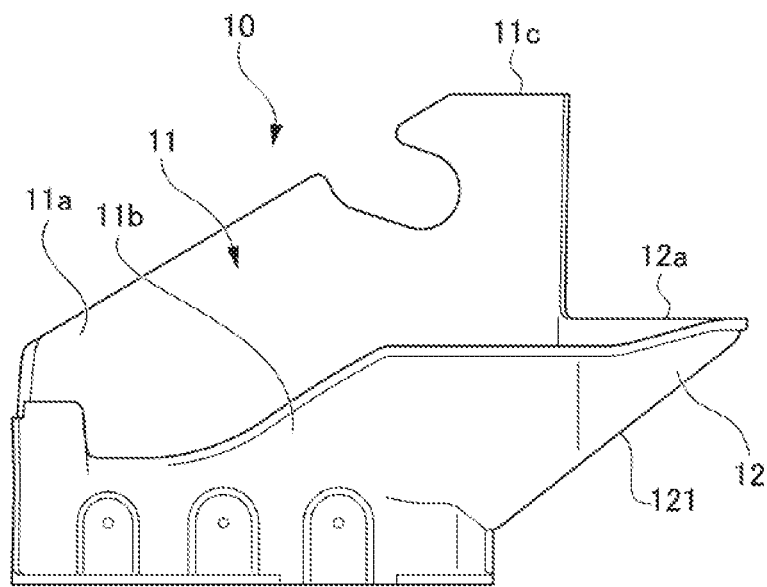

FIG. 4A is a perspective view of the guide portion 10, and FIG. 4B is a top view of the guide portion. As shown in FIG. 2 and FIGS. 4A, 4B the guide portion 10 is a part having a main body portion 11 and the extension portion 12 and formed of resin.

The main body portion 11 extends in the longitudinal direction of the vehicle 100, and is roughly formed into a tubular shape. An end on the ATF cooler 2 side of the main body portion 11 is a square tube shape formed along the outer edge of the ATF cooler 2, and is connected and fixed to the ATF cooler 2. As shown in FIG. 2 and FIG. 4a, a bottom face portion 11a of the main body portion 11 has a substantially triangular shape inclined so as to spread from a front face on the center side in the vehicle width direction of the bottom face portion 11a toward the rear on the outer side in the vehicle width direction, along an inclined shape of a front face of the vehicle 100. A top face portion 11b of the main body portion 11 is inclined upward toward the upper side.

The extension portion 12 is formed by extending a side face on the inner side in the vehicle width direction of the main body portion 11 in a direction perpendicular to the extending direction of the main body portion 11, that is, toward the center in the vehicle width direction. An extension portion front end 12a at the vehicle front end of the extension portion 12 is located behind a main body portion front end 11c at the front end of the main body portion 11.

As shown in FIG. 4B, the extension portion 12 has an extension wall 121 extending while being inclined toward the center in the vehicle width direction from the vehicle rear to the vehicle front. As shown in FIG. 2, the plate portion 52 is located at the front in the inclination direction of the extension wall 121, the plate portion 52 and the extension wall 121 are arranged next to the front grille opening 103 on a virtual extension line I of the extension wall 121, and the plate portion 52 is disposed along the inclination of the extension wall 121.

As shown in FIG. 1, a vertical dimension H2 of the extension portion 12 is smaller than a vertical dimension H1 of the main body portion 11. As shown in FIG. 1 and FIG. 4A, the extension portion 12 extends so as to partially protrude toward the inner side in the vehicle width direction, from slightly above the center in the height direction of the main body portion 11. The extension portion 12 is substantially triangular in plan view as shown in FIG. 2 and FIG. 4B, and is inclined so as to spread from the vehicle rear side to front side of the guide portion 10 connected to the ATF cooler 2, as shown in FIG. 4A. The extension portion 12 guides traveling air flowing in from the front grille opening 103 to the ATF cooler 2.

As shown in FIG. 1, the extension portion 12 is disposed next to the plate portion 52 of the bulkhead 5 with a space interposed therebetween. Additionally, an end on the center side in the vehicle width direction of the extension portion 12 faces the plate-shaped member 52a of the plate portion 52, and the reinforcement portion 52b of the plate portion 52 is located above the extension portion 12. Accordingly, the reinforcement portion 52b and the extension portion 12 are staggered in the vertical direction.

As shown in FIGS. 1 and 2, in apart of the guide portion 10 where the extension portion 12 is formed, in front view of the vehicle, a dimension W1 in the vehicle width direction of the whole guide portion 10 including the main body portion 11 and the extension portion 12 is substantially the same as or larger than a dimension W2 in the vehicle width direction of the fog lamp 102. Hence, the fog lamp 102 is stored within the maximum width of the guide portion 10.

Moreover, the vertical dimension H2 of the extension portion 12 is substantially the same as or larger than a vertical dimension H3 of a part of the fog lamp 102 disposed on the extension portion 12 side.

For this reason, even if the vehicle 100 crashes into an external object and the vehicle body deforms such that the fog lamp 102 is buried inside the vehicle 100, the fog lamp 102 only retracts into a space extending from behind the fog lamp 102 to the ATF cooler 2 inside the guide portion 10, and is less likely to affect the internal structure of the vehicle 100 located behind the guide portion 10.

FIG. 5 is an explanatory view for describing the flow path and pressure of air flowing into the front part of the vehicle 100. The flow of air in the front part of the vehicle 100 will be described with reference to FIG. 5. In FIG. 5, parts where the pressure is high are indicated by reference sign H, and parts where the pressure is low are indicated by reference sign L.

As shown in FIG. 5, traveling air flows from the fog opening 101 to the vehicle rear by being guided by the main body portion 11 of the guide portion 10. The flow path of traveling air from the fog opening 101 is referred to as a first flow path A1. The traveling air hits the ATF cooler 2 and cools the heat exchange medium inside, and thereby cools air inside the vehicle 100 behind the ATF cooler 2. The air cooled by the ATF cooler 2 flows into the wheelhouse portion 3 through the through holes 301 formed in the front side face portion 30 of the wheelhouse portion 3, and cools the hydraulic oil of the transmission, the front wheel 32, the brake 321, the brake caliper 322, and the like. At this time, when the vehicle 100 is traveling, rotation of the front wheel 32 sucks in air from the front. Hence, negative pressure is applied to the first flow path A1 from the rear side, and the flow rate of the first flow path A1 increases.

In addition, after flowing in from the front grille opening 103, the traveling air hits structures of the front part of the vehicle 100 such as the radiator 106 that are disposed on the center side in the vehicle width direction, and is directed toward the outer side in the vehicle width direction. For this reason, the traveling air flowing in from the front grille opening 103 flows from between the front grille opening 103 and the radiator 106 along the bulkhead 5, to the rear of the vehicle 100. The flow path of traveling air from the front grille opening 103 along the bulkhead 5 and toward the vehicle rear is referred to as a second flow path A2. The traveling air flowing through the second flow path A2 flows along the stay portion 51 and the plate portion 52, is guided by the extension portion 12 to join the first flow path A1, and heads toward the ATF cooler 2 behind the guide portion 10. The extension portion 12 extends from the main body portion 11 so as to block the space on the vehicle rear side of the ATF cooler 2. For this reason, the flow of air in the longitudinal direction of the vehicle 100 on the downstream side of the second flow path A2 is blocked by the extension portion 12, whereby negative pressure is generated behind the extension portion 12 and the pressure in front of the extension portion 12 increases. Accordingly, the extension portion 12, too, generates negative pressure on the rear side of the front part of the vehicle 100, so that air is more easily sucked in to the rear side.

A front structure 1 of the vehicle 100 of the embodiment exerts the following effects.

The front part of the vehicle 100 having the front grille opening 103 disposed in the center in the vehicle width direction and the fog opening 101 disposed on the outer side in the vehicle width direction, is provided with the guide portion 10 that guides traveling air from the fog opening 101 to the ATF cooler 2. The guide portion 10 is configured to include the tubular main body portion 11 extending in the longitudinal direction of the vehicle 100, and the extension portion 12 extending toward the center in the vehicle width direction from the main body portion 11 and guiding traveling air from the front grille opening 103 to the ATF cooler 2.

Hence, as compared to a case where a guide portion extending only in the longitudinal direction of the vehicle is provided, not only traveling air flowing in from the fog opening 101, but also traveling air flowing in from the front grille opening 103 can be guided to the ATF cooler 2. Since a sufficient amount of traveling air hitting the ATF cooler 2 can be ensured, the inside of the vehicle 100 can be cooled efficiently.

The front part of the vehicle 100 is provided with the bulkhead 5 having the stay portion 51 connected to the radiator 106 and bent from an end in the width direction of the radiator 106 toward the vehicle rear, and the plate portion 52 extending upward from the stay portion 51. Since the traveling air flowing from between the front grille opening 103 and the radiator 106 along the bulkhead 5 to the vehicle rear is guided to the ATF cooler 2 by the extension portion 12, the shape of the bulkhead 5 disposed inside the vehicle 100 can be utilized to ensure the amount of traveling air. Hence, a sufficient amount of traveling air hitting the ATF cooler 2 can be ensured.

The extension portion 12 is provided with the extension wall 121 extending while being inclined toward the center in the vehicle width direction from the vehicle rear to the vehicle front, and the plate portion 52 of the bulkhead 5 is formed along the inclination of the extension wall 121. Hence, the traveling air flowing along the plate portion 52 can be taken into the extension portion 12 while being guided by the extension wall 121, and can be brought into contact with the ATF cooler 2. Accordingly, not only can the airflow rate be increased, but also the shape of the plate portion 52 disposed inside the vehicle 100 can be utilized, so that the same effect as mentioned above can be exerted.

The vertical dimension of the extension portion 12 is formed smaller than the vertical dimension of the main body portion 11, to narrow the extension portion 12. Hence, the air pressure in the extension portion 12 increases, and strong traveling air can be transmitted to the ATF cooler 2.

The wheelhouse portion 3 housing the front wheel 32 is disposed at the vehicle rear of the ATF cooler 2. Additionally, the wheelhouse portion 3 is configured to include the front side face portion 30 having multiple through holes 301 connecting the space on the vehicle rear side of the ATF cooler 2 and the space inside the wheelhouse portion 3, and the extension portion 12 extends so as to block the space on the vehicle rear side of the ATF cooler 2. While traveling air is sucked in by rotation of the front wheel 32 through the through holes 301, the traveling air sucked in from the front grille opening 103 is partially blocked by the extension portion 12. Hence, a negative air pressure is generated on the vehicle rear side of the ATF cooler 2, and a pressure difference occurs on the front and rear of the ATF cooler 2. The pressure difference increases the amount of sucked in traveling air, and the cooling effect can be enhanced even more.

The fog lamp 102 is attached so that an opening open in the vehicle longitudinal direction is formed in a part of the fog opening 101. Additionally, the dimension of the guide portion 10 in the vehicle width direction is formed substantially the same or larger than the dimension of the fog lamp 102 in the width direction in front view of the vehicle. Moreover, the vertical dimension of the extension portion 12 is formed substantially the same or larger than the vertical dimension of the fog lamp 102 in front view of the vehicle. Accordingly, even if the vehicle 100 crashes into an external structure and the fog lamp 102 is crushed into the vehicle 100, since the fog lamp 102 can be received by the guide portion 10, the fog lamp 102 can be kept from going further than the guide portion 10 and colliding with structures in the vehicle rear.

The extension portion front end 12a is located behind the main body portion front end 11c. Hence, a larger amount of traveling air flowing from the front of the vehicle can be taken into the guide portion 10.

While an embodiment of the present disclosure has been described, the invention is not limited to this embodiment. Shapes, for example, of the fog lamp 102, guide portion 10, bulkhead 5, and the like, may be varied appropriately according to the type of vehicle or the like within the scope of the invention.

Although the opening in the embodiment is described as a fog opening for attaching a fog lamp as an example, the invention is not limited to this. The opening may be any opening other than the opening for attaching a fog lamp, as long as the opening is on the outer side in the vehicle width direction in the vehicle front part. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A vehicle front structure comprising:
   a front grille opening disposed at the center in a vehicle width direction in a vehicle front part;
   a radiator disposed at a rear of said front grille opening;
   a second opening disposed on an outer side in the vehicle width direction in said vehicle front part;
   a cooling device disposed at a rear of said second opening;
   a guide portion disposed between said second opening and said cooling device and guiding traveling air from said second opening to said cooling device; and
   a vehicle component having a stay portion connected to an end portion of said radiator in the width direction, and a plate portion connected to said stay portion, wherein:
   said guide portion comprises a tubular main body portion extending in a longitudinal direction of said vehicle, and an extension portion extending toward the center in the vehicle width direction from the main body portion and guiding traveling air from said front grille opening to said cooling device,
   wherein said extension portion is offset rearwardly relative to said radiator, said guide portion is disposed on an outer side of said radiator in the vehicle width direction, and said vehicle component is disposed at a position located in an extending direction of said extension portion.

2. The vehicle front structure according to claim 1 wherein said stay portion is bent from the end portion of said radiator toward the vehicle rear, and said plate portion extends upward from the stay portion, wherein:

said extension portion guides, to said cooling device, traveling air flowing through a space between said front grille opening and said radiator and flowing along said vehicle component toward the vehicle rear.

3. The vehicle front structure according to claim 2, wherein:
said extension portion has an extension wall extending in a vehicle forward direction while being inclined toward the center in the vehicle width direction; and
said plate portion is disposed along the inclination of said extension wall.

4. The vehicle front structure according to claim 1, wherein:
a vertical dimension of said extension portion is smaller than a vertical dimension of said main body portion.

5. The vehicle front structure according to claim 1, further comprising a wheelhouse portion disposed at the rear of said cooling device and housing a front wheel,
wherein said wheelhouse portion includes a front side face portion including a plurality of through holes connecting a space located on the vehicle rear side of said cooling device and a space inside said wheelhouse portion; and
said extension portion extends so as to block the space on the vehicle rear side of said cooling device.

6. The vehicle front structure according to claim 1, wherein:
a fog lamp is attached to said second opening so that said fog lamp partially closes said second opening and an opening open in the vehicle longitudinal direction is formed in a part of the second opening;
a dimension of said guide portion in the vehicle width direction is substantially the same as or larger than a dimension of said fog lamp in the width direction in front view of the vehicle; and
a vertical dimension of said extension portion is substantially the same as or larger than a vertical dimension of said fog lamp in the front view of the vehicle.

7. The vehicle front structure according to claim 6, wherein:
a front end of said extension portion is set back in a vehicle rear direction from a front end of said main body portion.

8. The vehicle front structure according to claim 1, wherein: said second opening is positioned on an outer side of said front grille opening in the vehicle width direction.

9. The vehicle front structure according to claim 2, wherein: said extension portion includes a front opening at a front end thereof.

10. The vehicle front structure according to claim 3, wherein: said plate portion is disposed aligned with the inclination of said extension wall.

11. The vehicle front structure according to claim 3, wherein: said extension wall is a rear wall.

12. The vehicle front structure according to claim 1, wherein: said guide portion is disposed entirely on the outer side of said radiator in the vehicle width direction.

* * * * *